United States Patent
Davis et al.

(10) Patent No.: US 6,511,179 B1
(45) Date of Patent: Jan. 28, 2003

(54) DESIGN OF A SOFT CONTACT LENS BASED UPON NOVEL METHODS OF CORNEAL TOPOGRAPHIC ANALYSIS

(75) Inventors: Brett A. Davis, Cooparoo (AU); Michael J. Collins, Mt. Nebo (AU); Jeffrey H. Roffman, Jacksonville, FL (US); Daoud R. Iskander, Hawthorne (AU); Denwood F. Ross, III, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

(21) Appl. No.: 09/372,715

(22) Filed: Aug. 11, 1999

(51) Int. Cl.[7] .............................. G02C 7/02; G02C 7/04
(52) U.S. Cl. .................... 351/177; 351/160 H
(58) Field of Search ............................. 351/160 H, 177, 351/160 R, 161, 162

(56) References Cited

U.S. PATENT DOCUMENTS

| | | | |
|---|---|---|---|
| 5,110,200 A | 5/1992 | Snook | 351/212 |
| 5,114,628 A * | 5/1992 | Hofer et al. | 264/1.4 |
| 5,293,533 A | 3/1994 | Klyce | 351/247 |
| 5,502,518 A | 3/1996 | Lieberman | 351/160 R |
| 5,570,142 A | 10/1996 | Lieberman | 351/160 R |
| 5,695,509 A | 12/1997 | El Hage | 606/166 |
| 5,880,809 A | 3/1999 | Lieberman et al. | 351/160 R |
| 6,145,988 A | 11/2000 | Manfredini | 351/177 |

OTHER PUBLICATIONS

"Inaugral–Dissertation zur Erlangung der Doktorwurde der Naturwissenschaftlich–Mathematischen Gesamtfakultat der Ruprecht—Karls–Universitat Heidelberg," Junzhong Liang, Dec. 1991.

\* cited by examiner

*Primary Examiner*—Jordan M. Schwartz
(74) *Attorney, Agent, or Firm*—Lois Gianneschi

(57) ABSTRACT

A method is provided which is used to design soft contact lens via corneal topographic analysis. The topography of the cornea is matched to a corresponding topography of a soft contact lens. A geometrical transformation which maps the corneal elevation onto the back surface of an unflexed soft contact lens is used to minimize errors induced by flexure of the lens. The mapping transformation takes into account the effects of flexure. As a result, the contact lens has a back surface with a curvature which matches the specific elevations of the cornea, while the front surface can be spherical or any desired symmetrical or asymmetrical shape.

29 Claims, 6 Drawing Sheets

DESIGN OF A SOFT CONTACT LENS BASED UPON NOVEL METHODS OF CORNEAL TOPOGRAPHIC ANALYSIS

FIELD OF THE INVENTION

The present invention generally relates to soft contact lenses and a method of designing such lenses. More specifically, the present invention relates to a soft contact lens and the design of such a lens using novel methods of corneal topographic analysis.

BACKGROUND OF THE INVENTION

The curvature of an unflexed soft contact lens, such as a lens placed in physiological saline solution. is different than the curvature of the same lens placed on the eye. This change in curvature is often referred to as flexure. (See. e.g., A. G. Bennet. "Power Changes In Soft Contact Lenses Due To Bending", *The Ophthalmic Optician,* 16:939–945. 1976, the contents of which are incorporated herein by reference). In the case of thin soft lenses placed on a typical eye, this change in curvature does not substantially affect the lens power. However, in the case of thick lenses of high positive power, bifocal soft lenses, or for subjects with corneal abnormalities (e.g., due to keratoconus), the change in power due to flexure may be significant.

SUMMARY OF THE INVENTION

The present invention matches the topography of the cornea to a corresponding topography of a soft contact lens. A geometrical transformation is used which maps the corneal elevation onto the back surface of an unflexed soft contact lens in such a way that the error induced by flexure of the lens is minimized. The mapping transformation takes into account the effects of flexure. The resulting contact lens has a back surface having a curvature which matches the specific elevations of the cornea, while the front surface can be spherical or any desired symmetrical or asymmetrical shape.

According to the present invention, a geometrical transformation is used which maps the corneal elevations, measured by a videokeratoscope, for example, into the back surface of an unflexed lens. The mapping is performed in such a way that the error introduced by flexure is minimized. The approach of the present invention utilizes a number of simplifications in achieving the desired lens design. The first simplification is that corneal elevations (i.e., difference away from an underlying best fit sphere) are taken as being much smaller than the apical radius of curvature of the cornea. The second simplification is that the lens material, when flexured, is uniformly deformed and all points on the lens stay in the same azimuthal angle. These simplifications help in achieving a practical engineering solution to the design of such lenses.

The mapping procedure is performed in two steps. First, the elevations of the cornea are mapped to a larger scale surface having a radius of curvature corresponding to that of an unflexed soft contact lens. Second, the scaled up elevation information is scaled down using an area preserving transformation.

Other features and advantages of the present invention will become apparent from the following detailed description, taken in conjunction with the accompanying drawings which illustrate, by way of example, the features of the present invention.

DETAILED DESCRIPTION OF THE PREFERRED EMBODIMENT

According to the present invention, arbitrary corneal topographic information is acquired about a subject's eye. This information is acquired, for example, using a corneal topographer which has high resolution along the z-axis, above and below the mean spherical surface of the cornea. This information is then mathematically transformed into elevation data. The elevation data may then be transformed onto a grid pattern, which may be rectilinear, polar concentric, or of a spiral format which corresponds to the mechanism by which the surface of the lens or lens mold may be tooled using a CNC (computer numeric control) lathe, mill or bit addressable device. The surface which is tooled or lathed may be the surface of a non hydrated corneal contact lens polymer button or an injection molded tool insert. The surface may also be tooled or lathed using a programmable laser ablation device.

Initially, the elevation data is applied to the soft contact lens model in its unflexed state. Also, the elevation data may be applied to the contact lens back surface only, the front surface only, or some defined combination of the front and back surfaces.

Next, the elevation data is transformed by taking into account soft lens flexure (i.e., wrap) when the lens is placed on the eye. Typically, soft lenses are flatter, e.g., by 1.0–1.5 mm, than the cornea that they are placed on. Thus, both elevation and wrap must be considered when utilizing the original corneal topographic data to make a soft contact lens surface or mold insert.

The flexure transformed elevation data may be mapped onto a CNC grid pattern and used to make a lens or a mold tool surface. The resulting lens utilizing such information will be a lens which exhibits fluctuations in thickness on the grid pattern which may or may not be rotationally symmetrical about the center of the lens. When the manufactured soft lens wraps perfectly to the underlying cornea, the fluctuations in surface elevation (i.e., above and below the mean spherical surface of the cornea) will typically disappear. In this way, corneal irregularities may be neutralized and optical aberrations due to irregular corneal topography may likewise be substantially eliminated. To achieve any additional degree of optical correction, such as spherical or astigmatic focus, appropriate curvatures may be incorporated in the front surface, back surface, or both front and back surfaces of the lens.

Figure 1:
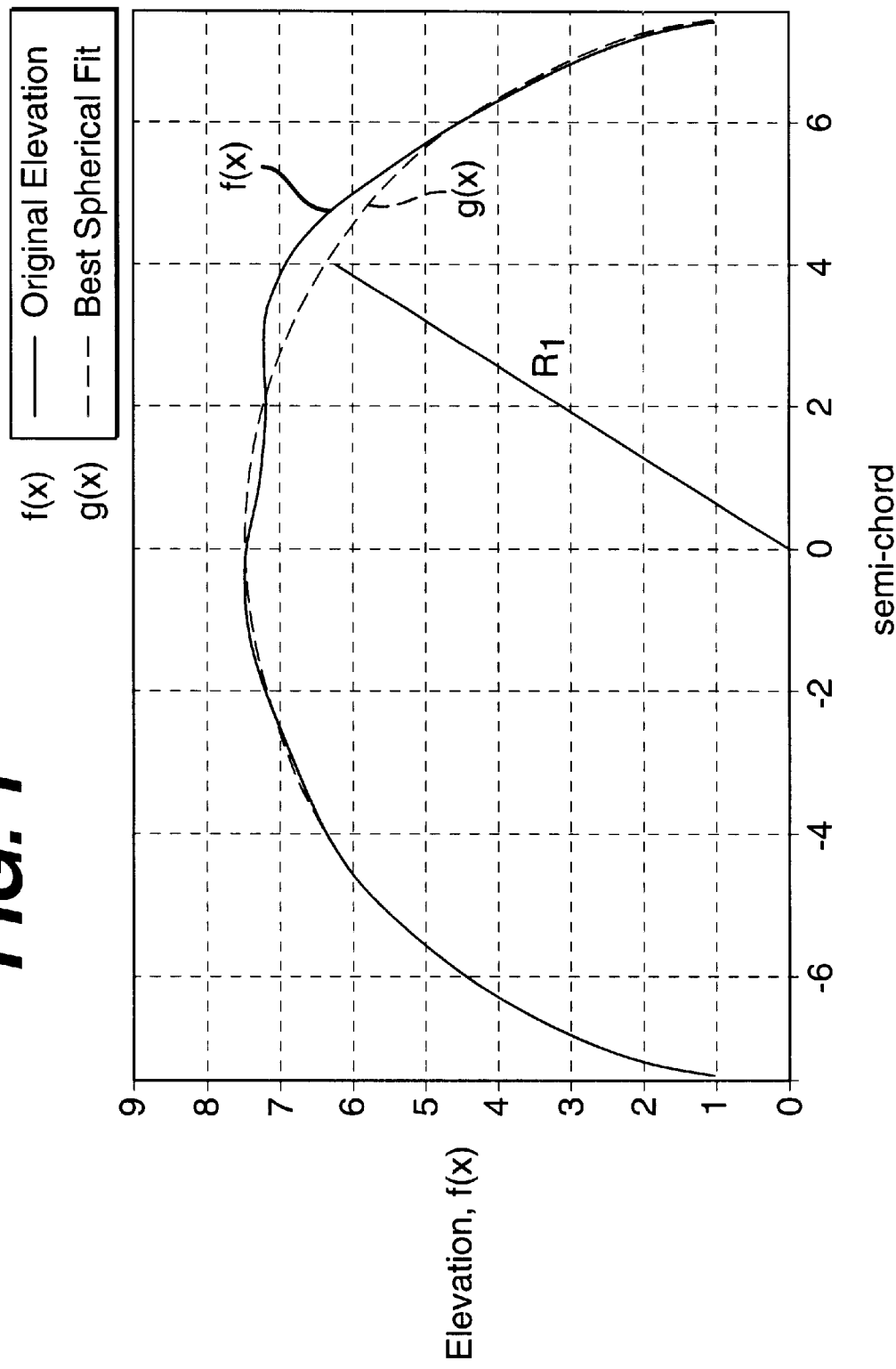
FIG. 1 is an illustration of the actual corneal elevations and their best spherical fit (in a least squares sense), denoted by f(x) and g(x), respectively.

For practical considerations, it is assumed that the ideal cornea is spherical. In such a case, the actual corneal elevations and their best spherical fit (in a least squares sense), are denoted by f(x) and g(x), respectively, as shown in FIG. 1. The function g(x) is part of a sphere having radius $R_1$.

In general, the radius $R_2$ of the unflexed soft contact lens is spherical and is larger than that of the best spherical fit, g(x). Accordingly, the first step is to transform the corneal elevations f(x) into a larger scale for which the best spherical fit will have a radius equal to $R_2$. One approach in simplifying the transformation is to represent the function f(x) in polar coordinates as f(θ). Then, using a scale factor, $\alpha = R_2/R_1$, the scaled version of the corneal elevation may be expressed as:

$$f^{(1)}(\theta) = \alpha f(\theta) \quad (1)$$

Figure 2:
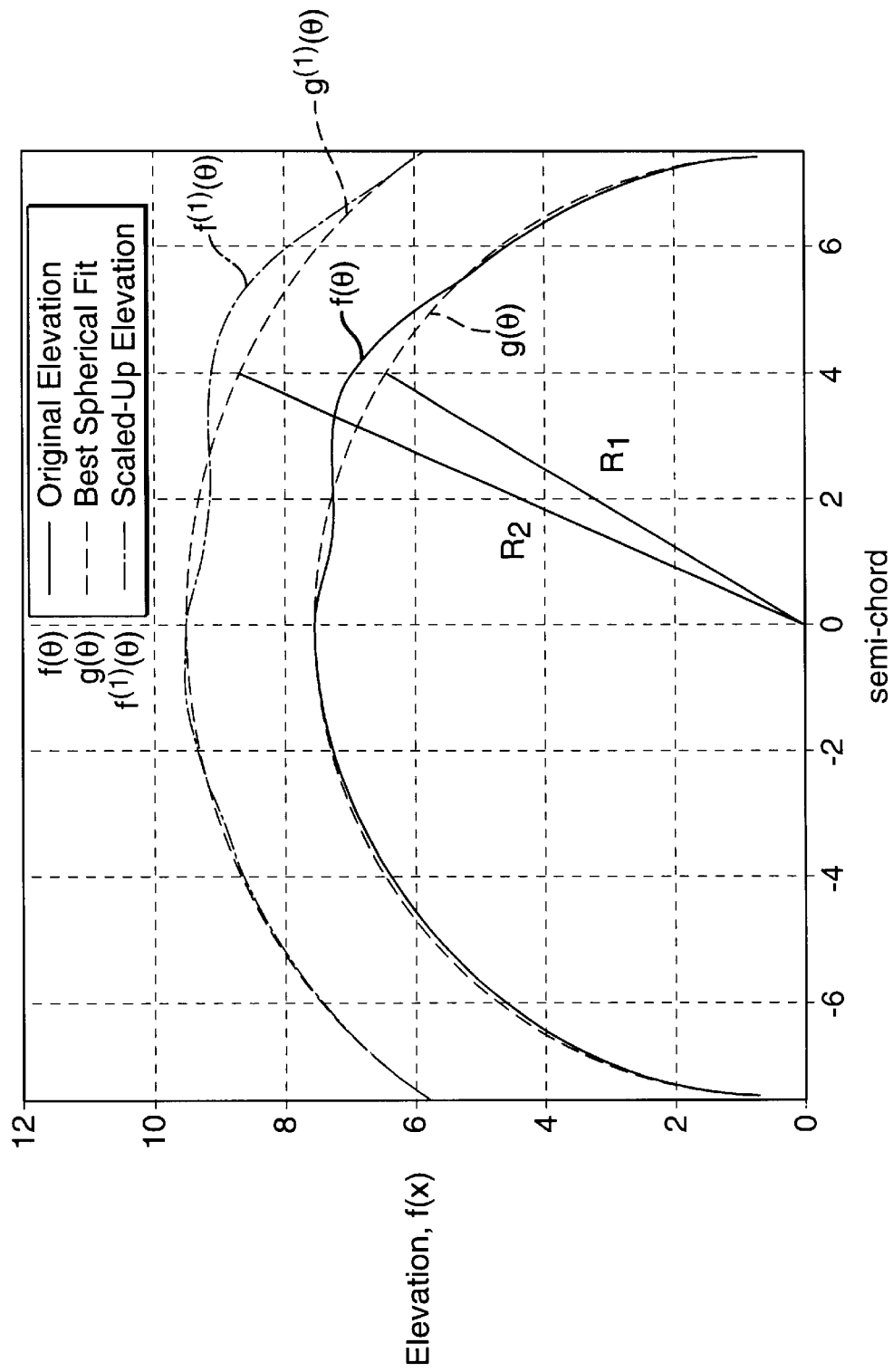
FIG. 2 is an illustration of the original elevation. $f(\theta)$, the best spherical fit for the original elevation. $g(\theta)$, the scaled up elevation, $f^{(1)}(\theta)$, and the best spherical fit for the scaled up elevation. $g^{(1)}(\theta)$.

FIG. 2 illustrates the original elevation. f(θ), the best spherical fit for the original elevation, g(θ), the scaled up elevation, $f^{(1)}(\theta)$, and the best spherical fit for the scaled up elevation, $g^{(1)}(\theta)$.

In the second stage, the scaled up corneal elevation $f^{(1)}(\theta)$ is scaled down so that the area covered by the soft lens corresponds to the area of the cornea. In a two dimensional case, this scaling down is obtained according to the following relationship:

$$f^{(2)}(\theta) = \alpha^{-1} f^{(1)}[(\theta - \pi/2)/\alpha + \pi/2] + R_2(1 - 1/\alpha) \quad (2)$$

Figure 3:
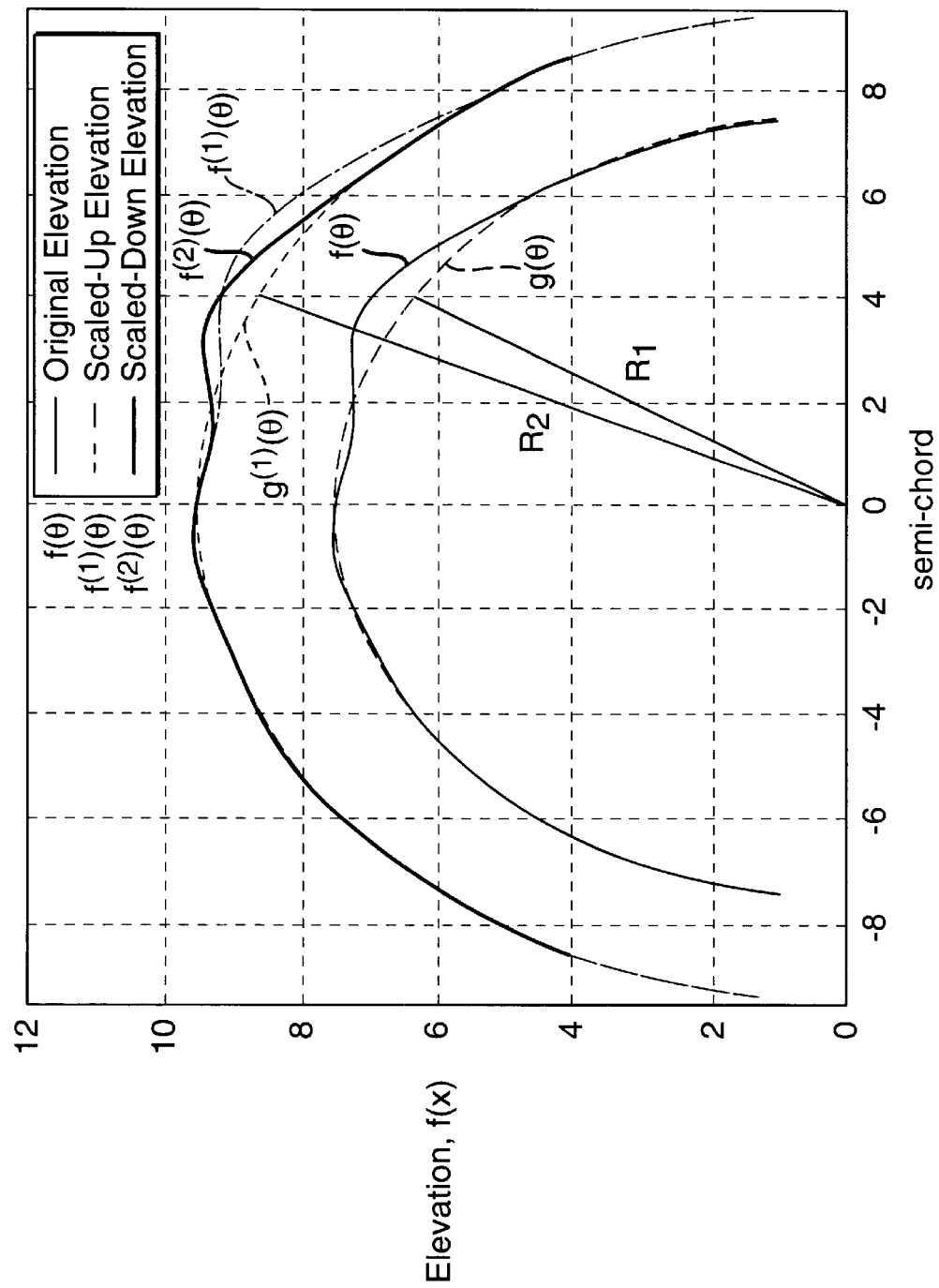
FIG. 3 is an illustration of the original corneal elevation, $f(\theta)$, the scaled up elevation, $f^{(1)}(\theta)$, and the scaled down elevation, $f^{(2)}(\theta)$, along with the best spherical fits, $g(\theta)$ and $g^{(2)}(\theta)$.

FIG. 3 illustrates the original corneal elevation, f(θ), the scaled up elevation, $f^{(1)}(\theta)$, and the scaled down elevation, $f^{(2)}(\theta)$, along with the best spherical fits, g(θ) and $g^{(1)}(\theta)$.

The mapping transformations given in Equations (1) and (2) are not restricted to the case where the cornea and the back surface of the contact lens are spherical. Rather, the true corneal and lens curvatures, as measured by a videokeratoscope, may be used to calculate the scale parameter α as a ratio between the lens and the corneal radius of curvature. In the general case, the scale parameter will be a function of θ, i.e., $\alpha = R_2(\theta)/R_1(\theta) = \alpha(\theta)$.

The mapping transformation discussed above may be generalized to the case of three dimensional transformation. In such a case, the corneal elevations may be represented by a function, f(θ,φ), where θ and φ represent the azimuth and elevation angle, respectively. As discussed above, the original elevation data is scaled up from a radius of curvature $R_1(\theta,\phi)$ onto a surface having a radius of curvature $R_2(\theta,\phi)$ using the following transformation relationship:

$$f^{(1)}(\theta,\phi) = \alpha f(\theta,\phi) \quad (3)$$

where $\alpha = R_2(\theta,\phi)/R_1(\theta,\phi)$.

Figure 4:
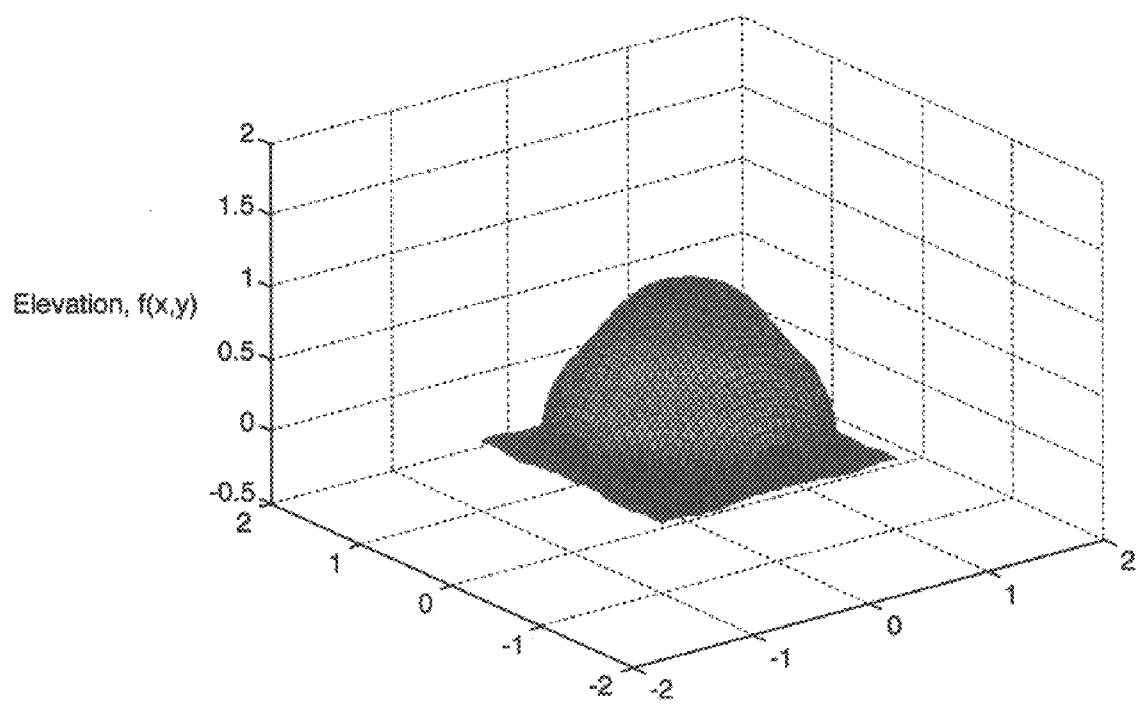
FIG. 4 is an illustration of an example where the original corneal elevations are modeled by a sphere with a superimposed two dimensional sinc function.
Figure 5:
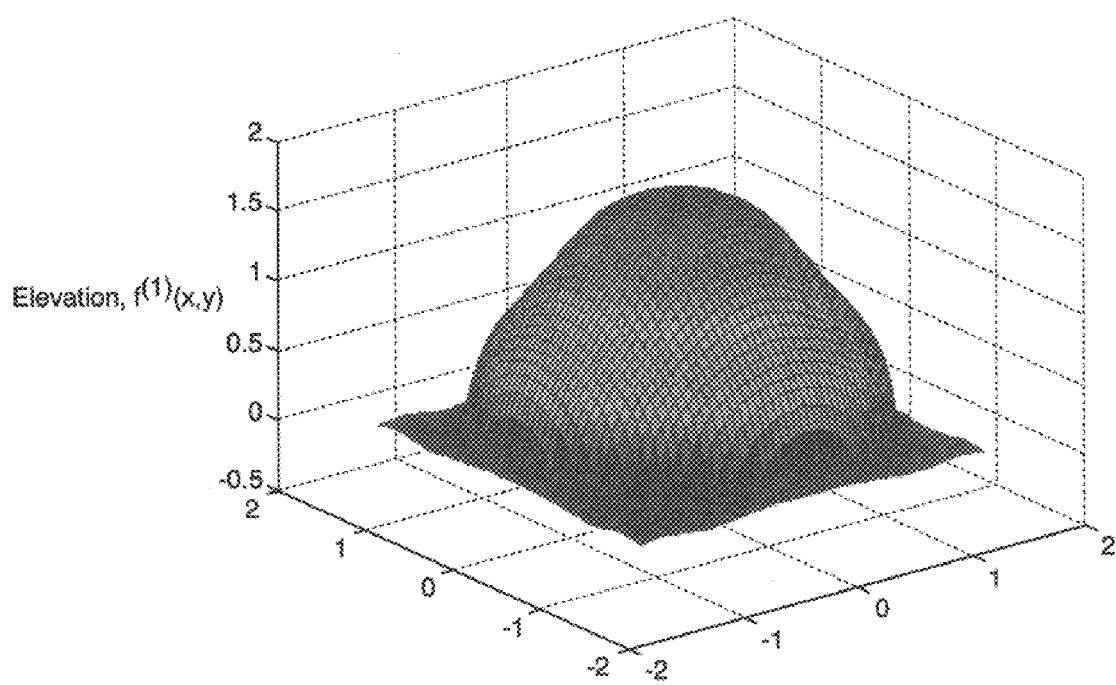
FIG. 5 is an illustration of the scaled up version of the corneal elevations illustrated in FIG. 4.

FIG. 4 illustrates an example where the original corneal elevations are modeled by a sphere with a superimposed two dimensional sinc function. FIG. 5 illustrates the scaled up version of the corneal elevations illustrated in FIG. 4, obtained using Equation (3) above.

To obtain a desired back surface of the soft contact lens, the function $f^{(1)}(\theta,\phi)$ is scaled back down, as discussed above. However, in the three dimensional case, there are a number of options to choose from in performing the scaling operation such that the area is preserved. For example, if it is assumed that the deformation of the material is uniformly radial, the scaling may be performed by scaling the elevation angle only, leaving the original azimuth angle. This is expressed in the following relationship:

$$f^{(2)}(\theta,\phi) = \alpha^{-1} f^{(1)}[\theta,(\phi - \pi/2)/\alpha + \pi/2] + R_2(1 - 1/\alpha) \quad (4)$$

Figure 6:
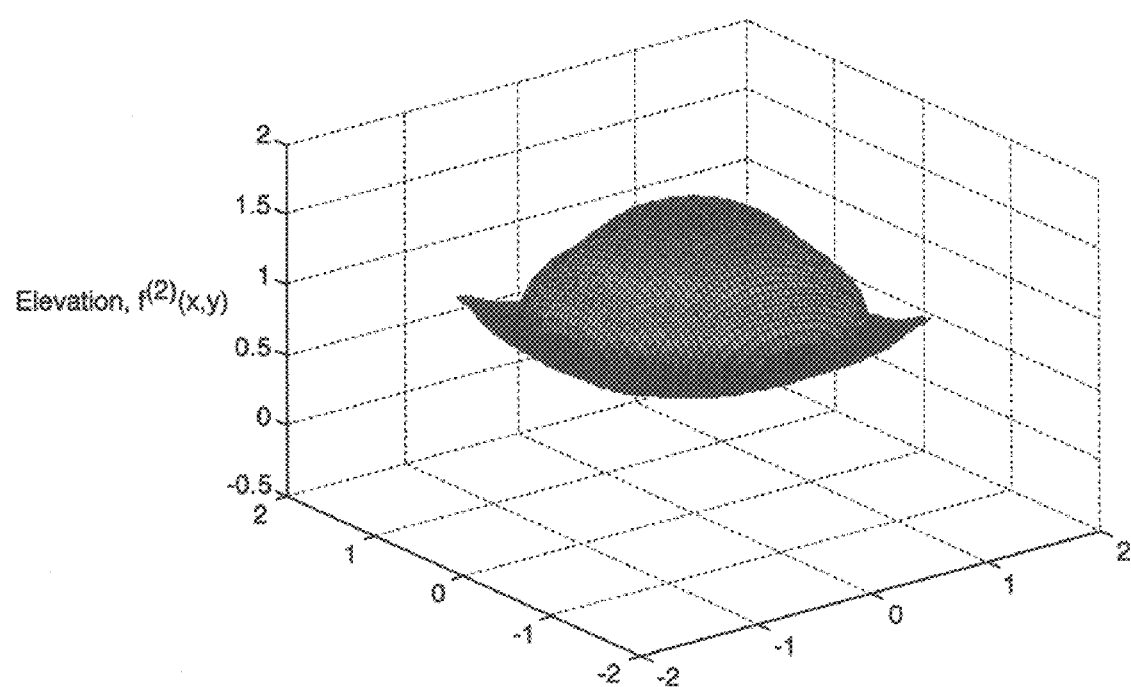
FIG. 6 is an illustration of the scaled down version of the corneal elevations obtained using Equation (4).

FIG. 6 illustrates the scaled down version of the corneal elevations obtained using Equation (4).

While forms of the invention have been illustrated and described, it will be apparent to those skilled in the art that various modifications and improvements may be made without departing from the spirit and scope of the invention. As such, it is not intended that the invention be limited, except as by the appended claims.

We claim:

1. A method for forming a soft contact lens, comprising the following steps:

acquiring corneal topographic data of an eye using a corneal topographer;

transforming the topographical data into elevation data;

mapping the elevation data into a grid pattern;

utilizing the grid pattern to form a surface of the lens;

applying the elevation data to a topography of the soft contact lens in an unflexed state; and transforming the elevation data from a scaled up state to a scaled down state by taking into account the lens in a flexed state.

2. The method of claim 1, wherein said step of utilizing comprises tooling the surface of the lens via one of a CNC lathe, mill and bit addressable device.

3. The method of claim 2, wherein said surface comprises one of a non hydrated corneal lens polymer button and an injection molded tool insert.

4. The method of claim 1, wherein said utilizing comprises tooling the surface of the lens via a programmable laser ablation device.

5. The method of claim 1, further comprising the following step of:

incorporating curvatures into at least one of a back surface, a front surface and a back and front surface of the lens.

6. The method of claim 5, wherein said step of incorporating comprises the following step of:

transforming corneal elevations of the lens into scaled up corneal elevations to obtain an optimum spherical fit for original corneal elevations.

7. The method of claim 6, wherein said step of transforming corneal elevations is performed according to a relationship:

$$f^{(1)}(\theta) = \alpha f(\theta);$$

wherein α is $R_2/R_1$, f(θ) is the corneal elevations in polar coordinates, $f^{(1)}(\theta)$ is the scaled up corneal elevations, $R_1$ is a radius of the lens in a flexed state and $R_2$ is a radius of the lens in an unflexed state.

8. The method of claim 7, wherein $R_1$ is a radius of the lens flexed on the cornea of the eye.

9. The method of claim 6, further comprising the following step of:

scaling down the scaled up corneal elevations to obtain an area covered by the lens which corresponds to a cornea of the eye.

10. The method of claim 9, wherein the area covered by the lens which corresponds to the cornea of the eye is a back surface of the lens.

11. The method of claim 9, wherein said scaled step down is performed according to a relationship:

$$f^{(2)}(\theta) = \alpha^{-1} f^{(1)}[(\theta - \pi/2)/\alpha + \pi/2] + R_2(1 - 1/\alpha);$$

wherein $\alpha^{-1}$ is $R_1/R_2$, $f^{(2)}(\theta)$ is a scaled down corneal elevation, $f^{(1)}(\theta)$ is the scaled up corneal elevations, $R_1$ is a radius of the lens in a flexed state and $R_2$ is a radius of the lens in an unflexed state.

12. The method of claim 11, wherein $R_1$ is a radius of the lens flexed on the cornea of the eye.

13. The method of claim 6, wherein said transforming corneal elevation is performed according to a relationship:

$$f^{(1)}(\theta, \phi) = \alpha f(\theta,\phi);$$

wherein $\alpha$ is $R_2(\theta, \phi)/R_1(\theta, \phi)$, ($\theta$) is an azimuth angle, $\phi$ is an elevation angle, $f^{(1)}(\theta, \phi)$ is the scaled up corneal elevations, $f(\theta, \phi)$ is three dimensional corneal elevations, $R_1(\theta, \phi)$ is a radius of the lens in a flexed state and $R_2(\theta, \phi)$ is a radius of the lens in an unflexed state.

14. The method of claim 13, wherein $R_1(\theta, \phi)$ is a radius of the lens flexed on the cornea of the eye.

15. The method of claim 6, further comprising the following step of:

scaling down the scaled up corneal elevations to obtain a desired back surface of the lens.

16. The method of claim 15, wherein said step of scaling down comprises scaling only an elevation angle to obtain a desired back surface curvature of the lens.

17. The method of claim 16, wherein said step of scaling only the elevation angle is performed according to a relationship:

$$f^{(2)}(\theta, \phi) = \alpha^{-1} f^{(1)}[\theta,(\phi-\pi/2)/\alpha+\pi/2] + R_2(1-1/\alpha);$$

wherein $\alpha^{-1}$ is $R_1(\theta,\phi)/R_2(\theta,\phi)$, ($\theta$) is an azimuth angle, $\phi$ is an elevation angle, $f^{(2)}(\theta, \phi)$ is the scaled down corneal elevations, $f^{(1)}(\theta, \phi)$ is the scaled up corneal elevations, $R_1(\theta, \phi)$ is a radius of the lens in a flexed state and $R_2(\theta, \phi)$ is a radius of the lens in an unflexed state.

18. The method of claim 17, wherein $R_1(\theta,\phi)$, is a radius of the lens flexed on the cornea of the eye.

19. A soft contact lens formed according to the method of claim 1.

20. A soft contact lens formed according to the method of claim 5.

21. A soft contact lens formed according to the method of claim 6.

22. A soft contact lens formed according to the method of claim 7.

23. A soft contact lens formed according to the method of claim 9.

24. A soft contact lens formed according to the method of claim 10.

25. A soft contact lens formed according to the method of claim 11.

26. A soft contact lens formed according to the method of claim 13.

27. A soft contact lens formed according to the method of claim 15.

28. A soft contact lens formed according to the method of claim 16.

29. A soft contact lens formed according to the method of claim 17.

\* \* \* \* \*